United States Patent [19]

Frank et al.

[11] Patent Number: 4,515,041

[45] Date of Patent: May 7, 1985

[54] CONTROL SYSTEM AND METHOD FOR A POWER DELIVERY SYSTEM HAVING A CONTINUOUSLY VARIABLE RATIO TRANSMISSION

[75] Inventors: Andrew A. Frank; Takashi Omitsu, both of Madison, Wis.

[73] Assignee: Aisin Seiki Kabushiki Kaisha, Kariya, Japan

[21] Appl. No.: 489,177

[22] Filed: Apr. 27, 1983

Related U.S. Application Data

[63] Continuation-in-part of Ser. No. 380,923, May 21, 1980.

[51] Int. Cl.$^3$ ................. B60K 41/18; B60K 41/12
[52] U.S. Cl. .................................. 74/866; 74/857; 74/865
[58] Field of Search .............. 74/866, 865, 860, 859, 74/858

[56] References Cited

U.S. PATENT DOCUMENTS

| | | | |
|---|---|---|---|
| Re. 24,347 | 12/1959 | Miner | 74/230.17 |
| 2,059,591 | 11/1936 | Leoni | 74/857 |
| 2,131,157 | 9/1938 | Almen et al. | 74/865 |
| 3,008,341 | 11/1961 | Cobb | 74/687 |
| 3,044,316 | 7/1962 | Forster | 74/865 |
| 3,256,747 | 6/1966 | Kempson | 74/865 |
| 3,368,426 | 2/1968 | Karig et al. | 74/865 |
| 3,552,232 | 1/1971 | Kress | 74/689 |
| 3,616,706 | 11/1971 | Shimamoto | 74/230.17 |
| 3,861,485 | 1/1975 | Busch | 74/869 |
| 3,890,360 | 6/1975 | Prurot et al. | 74/860 |
| 4,008,567 | 2/1977 | Hirsch | 74/866 |
| 4,023,442 | 5/1977 | Woods et al. | 74/863 |
| 4,091,690 | 5/1978 | Miyao | 74/865 |
| 4,107,776 | 8/1978 | Beale | 74/866 |
| 4,152,947 | 5/1979 | Van Deursen et al. | 74/230.17 |
| 4,220,059 | 9/1980 | Mizuno et al. | 74/865 |
| 4,281,567 | 8/1981 | Maurer | 74/859 |
| 4,346,625 | 9/1982 | Latsch et al. | 74/866 |

FOREIGN PATENT DOCUMENTS

| | | | |
|---|---|---|---|
| 1182150 | 6/1959 | France | 74/866 |
| 1592060 | 7/1981 | United Kingdom | 474/18 |

OTHER PUBLICATIONS

Stubbs, "The Development of a Perbury Traction Transmission for Motor Car Applications", ASME, 1980.

Ironside et al., "Continuously Variable Transmission Control", Vehicular Technology Society, IEEE, 1980.

Beachley et al., "Principles and Definitions for CVTs with Emphasis on Automotive Applications", ASME, 1980.

"Porsche Features Engine and Driveline Efficiency", Automotive Engineering, vol. 90, No. 1, Jan. 1982, pp. 38-48.

Rayward et al., "Design Study of Torodial Traction CVT for Electric Vehicles", 1980.

Oliver et al., "Design Equations for a Speed and Torque Controlled Variable Ratio V-Belt Transmission", SAE, 1973.

Frank, "Disclosure and Record of Invention", Sep. 30, 1980.

*Primary Examiner*—George H. Krizmanich
*Assistant Examiner*—Dirk Wright
*Attorney, Agent, or Firm*—Banner, Birch, McKie & Beckett

[57] ABSTRACT

A control system and method for a power delivery system, such as in an automotive vehicle, having an engine coupled to a continuously variable ratio transmission (CVT). Totally independent control of engine and transmission enable the engine to precisely follow a desired operating characteristic, such as the ideal operating line for low fuel consumption. CVT ratio is controlled as a function of commanded desired system performance (e.g., power or torque) and measured actual system performance, such as CVT torque output, while engine fuel requirements (e.g., throttle position) are strictly a function of measured engine speed. Fuel requirements are therefore precisely adjusted in accordance with the ideal characteristics for any load placed on the engine. Appropriate controls prevent anomalous engine and vehicle behavior, and allow for transient start-up from rest. In a preferred embodiment a proportional controller is used to set the driving diameter of the driver sheave of a V-belt traction drive CVT, while the drive diameter of the driven sheave is controlled by a torque ramp.

73 Claims, 12 Drawing Figures

CONTROL SYSTEM AND METHOD FOR A POWER DELIVERY SYSTEM HAVING A CONTINUOUSLY VARIABLE RATIO TRANSMISSION

This application is a continuation-in-part of copending application Ser. No. 380,923, filed May 21, 1980.

BACKGROUND OF THE INVENTION

This invention relates to a power delivery system having a continuously variable ratio transmission and, more particularly, to a control system and a control method for such a system, such as might be used in an automotive vehicle.

The quest for greater fuel economy of automotive vehicles has led to significant improvements in engine and transmission design and control. Continuously variable ratio transmissions (CVT) have shown particular promise in this regard. It will be appreciated that at any given vehicle speed, and for any needed propulsive force, a certain transmission ratio will provide maximum fuel economy for a given engine. In addition, for any given vehicle speed, one transmission ratio will permit maximum acceleration with that engine. Since a CVT with the proper ratio range can provide any desired transmission ratio, it is obviously attractive for automobiles from the standpoint of economy, low emissions and performance. If the mechanical efficiency of the CVT is high and its ratio range is wide enough, it can even be possible to have both maximum economy and maximum performance in the same vehicle. Among the obvious benefits are fully automatic operation, smooth, stepless and rapid response to driver demand, and quieter cruising.

Many different CVT configurations have been developed in the prior art. These include, for example, hydrostatic transmissions; rolling contact traction drives; overrunning clutch designs; electrics; multi-speed gear boxes with slipping clutch; and V-belt traction drives. Of these the V-belt traction drives appear attractive for small to medium size passenger car applications because of their compactness, lightness and simplicity of design. Basically, this type of CVT comprises a V-belt which interconnects a driver sheave and driven sheave, the diameters of the sheaves being variable to change the ratio of the CVT. Recent advances in belt design have resulted in improved belt durability and longevity. If sheave movement can be properly controlled so as to avoid undue stresses on the belt, it is expected that a very long belt life can be achieved.

Many control schemes have been devised for engine-CVT systems in attempts to maximize fuel economy. These have been based on empirical analyses of individual engine performance, and the realization that, for any desired power output, there is an optimum combination of engine speed and torque which will result in minimum fuel consumption. This is illustrated in FIG. 1.

FIG. 1 is a typical performance map of a four cylinder spark ignition passenger car engine having a displacement of approximately 2.5 liters. The map is a plot of engine torque $T_E$ and brake horsepower BHP as a function of engine speed $N_E$. The dot-dash line near the top of the map is a plot of engine torque at full throttle. The series of curves in solid black lines are fuel consumption contours, indicating constant brake specific fuel consumption (BSFC) in lb.M/BHP-hr. Minimum fuel consumption occurs at a point designed by 0.4 pounds per horsepower-hour. The series of dashed lines indicates power output of the engine. The ideal operating line for low fuel consumption is indicated by the heavy solid line $f(N_E)$, this curve being a function of engine speed. The ideal operating for low fuel consumption is purely a function of engine characteristics and is optimal regardless of vehicle road speed. Other ideal operating lines may appear on the performance map, for example, the ideal operating line for low emissions.

In a vehicle with a conventional, manually shifted gearbox, forward speed ratios usually are available in only four or five steps. The operating point of the engine on the performance map is determined by drive shaft speed, power or torque commanded, and transmission gear ratio. Since there are only a few gear ratios available in a typical transmission, the engine must be throttled much of the time. The engine must therefore operate most the time at high BSFC values. In contrast, a CVT is able to vary its speed ratio continuously to allow the engine to run at wider throttle and lower BSFC values.

Perhaps the most difficult task demanded of a control system for an engine-CVT system is to maintain engine operation along the ideal operating line. This is due to the almost continuous transient nature of operation of an automotive vehicle, there being hardly ever a time when road load and commanded torque or power remain constant. Transient conditions usually are dealt with by a change in CVT ratio, engine speed and throttle. Prior art control systems, by their very nature, permit an excursion of engine operation away from the ideal operating line before returning back to it at steady state. An example of such an excursion is shown in FIG. 1 by dashed line X-Y-Z. The result is that engine operation approaches, but hardly ever is maintained on the ideal operating line. Two such prior art systems are illustrated in FIGS. 2 and 3.

FIG. 2 schematically illustrates a system devised by Peter Stubbs for British Leyland. This system is described in greater detail in Stubbs, *The Development of a Perbury Traction Transmission for Motor Car Applications,* ASME Publication No. 80-C2/DET-59 (August, 1980). In this system, engine speed, throttle position and CVT ratio signals are all fed to a computer controller which has, in its memory, the engine operating characteristic for minimum fuel consumption. The computer controller generates, as a function of these variables, an engine control signal for adjusting the position of the throttle, and a ratio rate signal which changes the ratio of the CVT. The throttle is under the direct control of the vehicle accelerator pedal so that, while the engine control signal may vary the throttle position somewhat from that commanded by the driver, the throttle position still is primarily a function of commanded power or torque.

FIG. 3 is a schematic representation of the system devised by Miyao for Aisin Seiki. This system is described in greater detail in U.S. Pat. No. 4,091,690. Here, as in the Stubbs system, engine throttle is primarily a function of commanded power or torque by direct connection with the accelerator pedal. The computer generates a ratio rate signal to change torque and speed. Inherently sensed output torque also affects the CVT ratio.

In these, as well as in virtually all other engine-CVT control systems, throttle position is controlled directly by the vehicle accelerator pedal, or is a direct function of pedal position, as well as other parameters. Engine and transmission control usually are directly related to one another. Such control schemes permit engine operation during transients to vary from the ideal operating line. Excursions away from the ideal operating line result in less than optimum engine operation (e.g., excessive fuel consumption, or excessive emissions), until effective control is resumed by the system during steady state operation. As pointed out earlier, however, most vehicular operation is transient in nature, rather than steady state, so that substantially all engine operation occurs off the ideal operating line. Emissions calibrations must therefore be made in a substantial portion of the engine performance map. Most prior art control systems also must be specifically tailored to particular engines. This requires numerous specially designed control systems for a fleet of differently powered vehicles. In addition, most prior art control systems cannot compensate for varying engine conditions, the result being vehicle driveability which varies with engine temperature, state of tune, age and altitude. Close duplication of conventional vehicle characteristics also is a problem with prior art CVT control schemes.

SUMMARY OF THE INVENTION

It is therefore an object of the present invention to overcome the above-noted disadvantages and deficiencies of the prior art by providing an engine-CVT control scheme which substantially constantly maintains engine operation along the ideal operating line.

Another object of the invention is to provide such a control scheme which yields substantially constant vehicle driveability as sensed by the driver, irrespective of engine temperature, age, state of tune, altitude and other variables.

Another object of the invention is to provide such a control scheme in a vehicle whose characteristic will remain the same irrespective of the type of engine which is coupled to the CVT.

Another object of the invention is to provide such a control scheme in a CVT vehicle, which will enable the vehicle to perform almost in all respects as a vehicle with a conventional transmission.

Another object of the invention is to greatly simplify calibration of the engine for emissions purposes.

Surprisingly it has been found that engine operation can readily be maintained along the ideal operating line by providing for toally independent engine and transmission control. That is, the position of the engine throttle is totally independent of accelerator pedal position. Throttle position and, hence, engine output torque simply is a function of engine speed only, and that function may be any desired relationship, for example, the ideal operating line for low fuel consumption, the ideal operating line for low emissions, or a compromise ideal operating line for low fuel consumption and low emissions. Torque, power or other desired performance parameters commanded by the accelerator pedal controls CVT ratio, and engine speed is determined by the load placed theron, which is a function of road load and CVT ratio. Hence, throttle position is precisely adjusted in accordance with the ideal function for any load placed on the engine. With appropriately designed controls, which also are a part of this invention, anomalous engine and vehicle behavior, such as engine overspeed and underspeed conditions, can be prevented, transient start-up from rest can be accommodated, and the vehicle can be made to perform almost in all respects just as a vehicle with a conventional automatic transmission.

For convenience, the invention is described throughout this specification in the context of an engine-CVT propulsion system for an automotive vehicle. It is to be understood, however, that the principles of the invention are equally applicable to any type of power delivery system, including but not limited to other vehicular systems using internal or external combustion engines of any design, or to stationary power plants for driving compressors, generators or any other type of machinery. Where the term "throttle" is used, the term is understood to encompass any mechanism for controlling the delivery of fuel to the engine or other prime mover, be it a conventional carbureted spark-ignition engine wherein fuel flow varies with throttle butterfly position, a fuel injected spark-ignition or diesel engine, a gas turbine, and so on.

The above and other objects of the invention are accomplished by providing a method of controlling the operation of a power delivery system including a prime mover and a continuously variable ratio transmission coupled to the prime mover for delivering power from the prime mover to an output shaft. The transmission has adjustable driver means operatively coupled to the prime mover for adjustably transmitting power from the prime mover, and adjustable driven means operatively coupled to the driver means and to the output shaft for adjustably transmitting power from the driver means to the output shaft, the ratio of the transmission being determined by the relative adjustments of the driver means and the driven means. The prime mover has fuel delivery means for delivering a variable quantity of fuel thereto, and the power delivery system is controlled by command means for commanding a desired system performance parameter, such as output power or torque delivered to the output shaft. The method includes the steps of measuring the actual performance of the system, and controlling the ratio of the transmission as a function of the commanded performance parameter and the measured actual performance of the system, the speed of the prime mover varying as a function of transmission ratio. Ratio control is accomplished by controlling the adjustment of the driver means as a function of the commanded performance parameter, and controlling the adjustment of the driven means as a function of the measured actual system performance. A fuel function is predetermined which defines desired fuel requirements for the prime mover in relation to prime mover operating speed. The speed of the prime mover is measured, and the fuel delivery means is controlled in accordance with the fuel function so that the fuel delivered to the prime mover is determined only by the speed thereof.

Also included are steps for preventing engine overspeed and underspeed conditions by changing the transmission ratio to respectively increase or decrease the load on the prime mover, and especially for vehicular applications, for decreasing the sensitivity of the command means (e.g., the accelerator pedal) during relatively fast vehicle operation to essentially duplicate the operating characteristics of a vehicle with a conventional automatic transmission.

The invention also encompasses a system for carrying out the above-described method, a power delivery system including the prime mover, transmission and control system therefor, and a control system for use in a motor vehicle.

BRIEF DESCRIPTION OF THE DRAWINGS

The novel features of the invention are set with particularity in the appended claims, but the invention will be understood more fully and clearly from the following detailed description of the invention as set forth in the accompanying drawings, in which:

FIG. 8 primarily relates to the engine control circuit;

FIG. 9 primarily relates to the starting clutch control circuit; and

DETAILED DESCRIPTION

Figure 4:
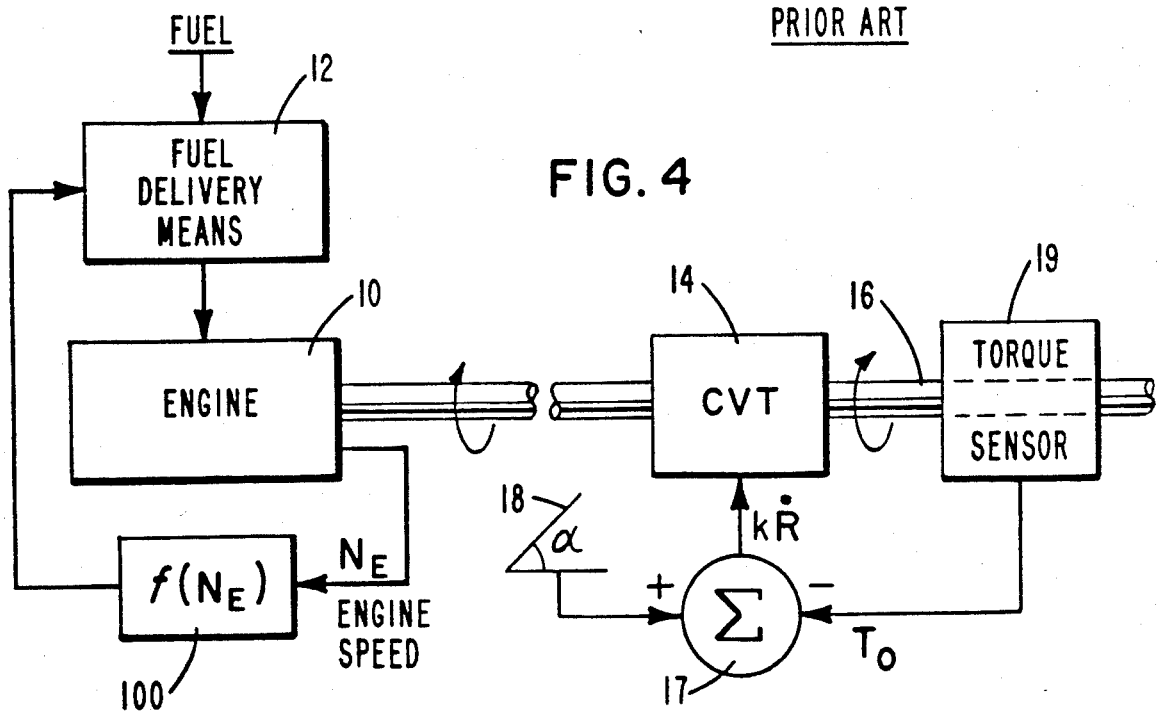
FIG. 4 is a schematic illustration showing the functional relationships of the components of an engine-CVT control scheme according to the invention.

FIG. 4 illustrates the functional relationships of the components of the invention. An engine 10 is drivingly coupled to a continuously variable ratio transmission (CVT) 14 through a clutch or fluid coupling (not shown). Fuel is fed to engine 10 by a fuel delivery means 12, which may be the throttle and fuel jets of a conventional carburetor, a fuel injection system or the like. CVT 14 may be one of the many types of continuously variable ratio transmissions discussed above in connection with the prior art, although the V-belt traction drive type of CVT is preferred. Output shaft 16 delivers power and torque from the engine and CVT. The ratio of the CVT is set by a CVT ratio controller 17, which generates a rate of change of ratio signal kR as a function of output torque $T_O$ measured by torque sensor 19 and commanded power or torque $\alpha$ commanded by accelerator pedal 18. Other parameters indicative of engine-CVT system performance may be used by ratio controller 17 to effect a change of CVT ratio in a similar manner. For example, rather than using desired output power or torque and measured actual output torque, commanded and measured vehicle acceleration, output shaft acceleration, or other parameters could be used. In this preferred embodiment, however, CVT ratio is strictly a function of commanded power or torque and measured output torque, and is completely independent of engine operation. Engine control, on the other hand, is provided by an engine controller 100 which adjusts fuel delivery means 12 in accordance with measured engine speed $N_E$. This relationship may desirably be the ideal engine operating line for low fuel consumption, the ideal operating line for low emissions, a compromise of the two, or any other desired engine operating characteristic.

Figure 5:
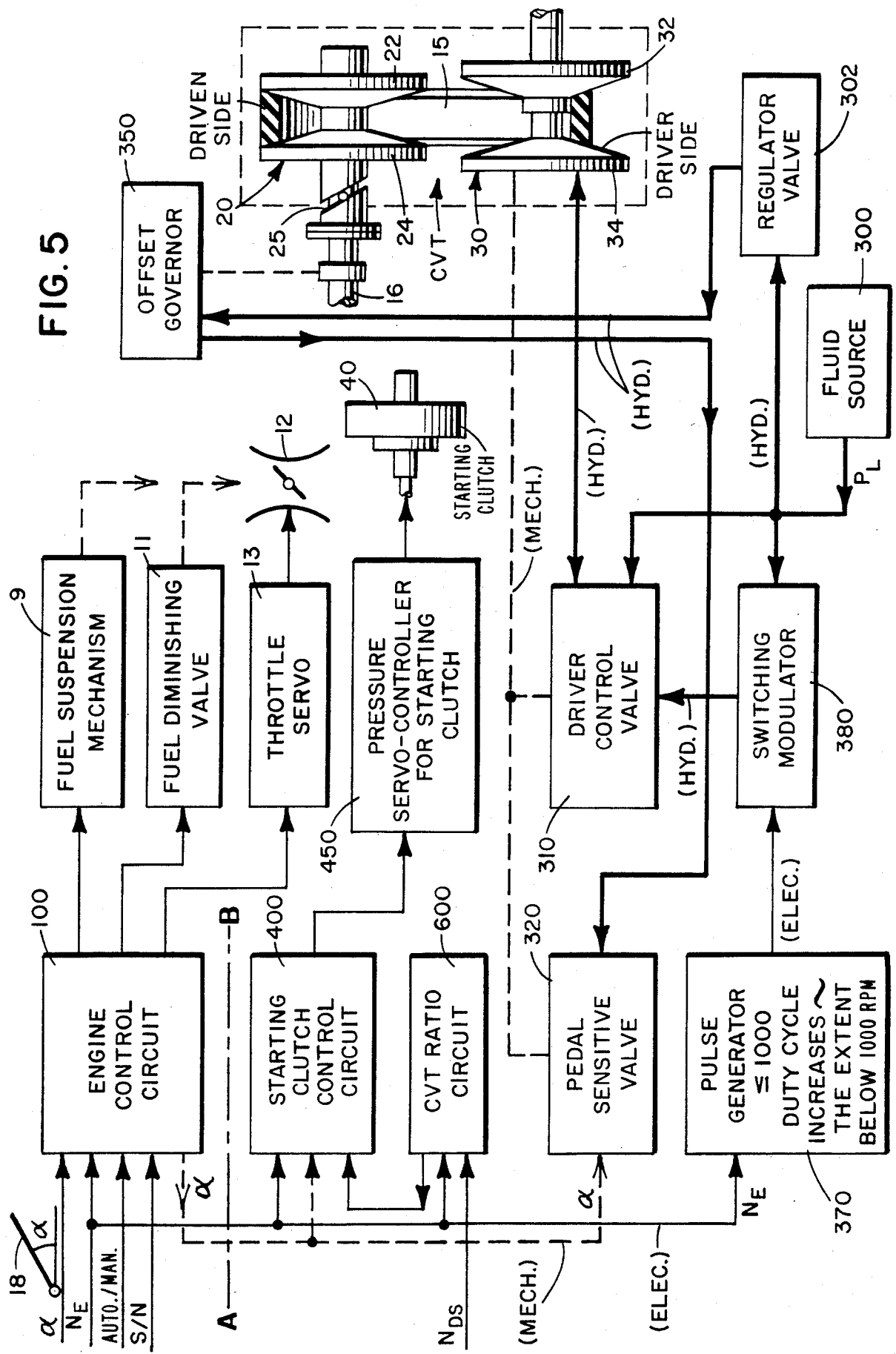
FIG. 5 is a schematic illustration showing the entire control system of the invention and its relationship to the CVT sheave and belt drive, and the vehicle starting clutch.

FIG. 5 schematically illustrates the entire control system in greater detail. The particular type of CVT illustrated in FIG. 5 is the variable diameter pulley, V-belt traction drive type having a driven sheave 20 connected to output shaft 16 and a driver sheave 30 which is coupled to engine 10. Belt 15 engages the grooves in the sheaves 20 and 30 to transmit motive power therebetween.

Figure 6:
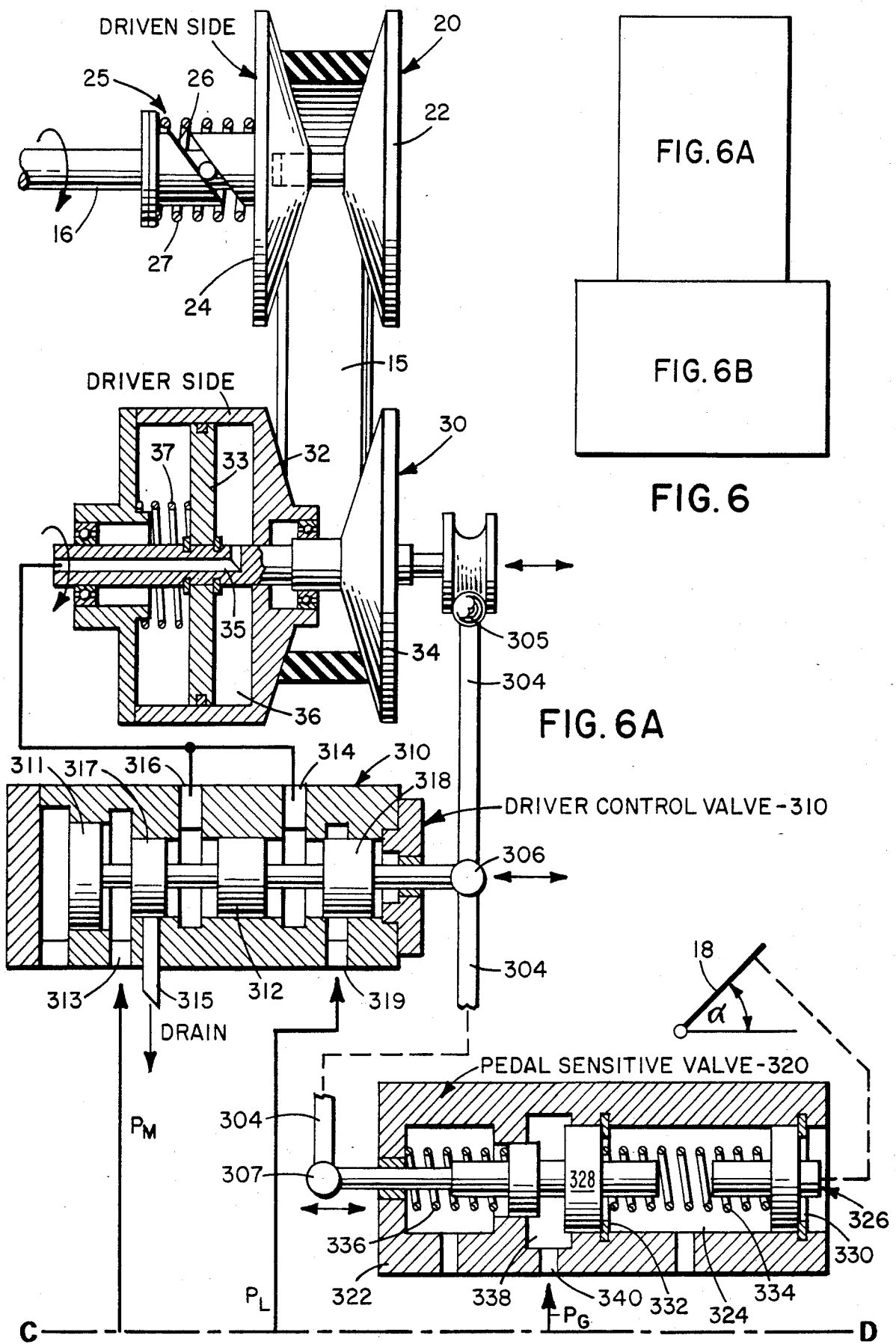
FIG. 6, which is a composite of FIGS. 6A and 6B interrelated by line C-D, schematically illustrates the mechanical, electrical and hydraulic control of the driver sheave of the transmission.

Sheave 30 is hydraulically actuated by pressurized fluid to vary its driving diameter. Referring to FIG. 6A, sheave 30 has an axially fixed flange portion 32 and an axially movable flange portion 34. Pressurized fluid in a fluid actuation chamber 36 between fixed flange portion 32 and a piston 33 provides the axial force required to maintain flange portions 32 and 34 at a fixed distance from one another (i.e., to hold the driving diameter of sheave 30 constant), and to move flange 34 toward or away from flange 32 to vary the driving diameter. Hydraulic fluid is delivered to or drained from chamber 36 through a port 35; drainage is assisted by compression spring 37 located behind piston 33.

Driven sheave 20 has an axially fixed flange portion 22 and an axially movable flange portion 24 which also is rotatable relative to fixed flange 22. Instead of being hydraulically actuated, however, movement of movable flange portion 24 is effected by a torque ramp assembly 25. In this known type of mechanism, load on the output shaft 16 is converted to axial force on the belt 15 in the groove between the flanges 22, 24 by several helical torque ramps 26. A torsion-compression spring 27 also constrains movable flange 24. These components act together and, at equilibrium, all of the forces and torques are balanced and dictate an operating point that depends upon output torque. As the output torque increases, the force that must be transmitted through the ramps 26 increases. This force has an axial component that tends to force the movable flange 24 toward the fixed flange 22, thereby raising belt tension and increasing the torque transmitted by the belt. The torque of spring 27 and the output torque of the drive are balanced by the belt torque. Transmission ratio, of course, is the quotient of driver sheave diameter and driven sheave diameter.

As explained more fully below, commanded power or torque is applied as an hydraulic pressure (constant, increasing or decreasing) only to actuation chamber 36 of driver sheave 30. Since the distance between the sheaves 20, 30 and the length of the belt 15 are fixed, the drive diameter of driven sheave 20 will be determined by the positively controlled driving diameter of the driver sheave 30 and the output torque delivered by the belt. The transmission ratio R is, therefore, a function of commanded power or torque $\alpha$ (18, FIG. 4) and output torque $T_O$ (19, FIG. 4), with any difference between these two parameters causing a change in ratio through the inherent physical interrelationship among the sheaves and the belt (17, FIG. 4), the rate of ratio change R being proportional to the difference. As compared to the transmission arrangement described in our earlier application Ser. No. 380,923, which involved hydraulically actuated driver and driven sheaves and a complex hydraulic pressure proportioning system, the arrangement of this invention is a great simplification, requiring positive and simple hydraulic control of only the driver sheave.

Referring again to FIG. 5, the position of throttle (fuel delivery means) 12 is controlled by a throttle servo 13 which receives signals from engine control circuit 100. During certain transient operations (described below) fuel delivery may be diminished by a fuel diminishing valve 11, or fuel delivery may be suspended completely by a fuel suspension mechanism 9. The fuel diminishing and suspension functions may be performed, for example, by a single solenoid valve operable in variable modes. Engine control circuit 100 is responsive to inputs from the accelerator pedal ($\alpha$), engine speed ($N_E$), a manual override switch which permits operation in the automatic or manual mode, and a start/neutral switch (S/N) which insures that the vehicle will remain stationary when the engine is started.

A starting clutch 40 is provided which couples engine 10 and CVT 14. Clutch 40 is disengaged when the vehicle is stationary, and is partially engaged during slow vehicle operation, gradually approaching full engagement, which occurs as described below at a predetermined point of operation. Starting clutch 40 is controlled by a control circuit 400 which is responsive to accelerator pedal position $\alpha$, engine speed $N_E$, CVT ratio R (generated by CVT ratio circuit 600 as the quotient of engine speed $N_E$ and drive shaft speed $N_{DS}$), and the auto/manual switch, through servo controller 450.

Figure 1:
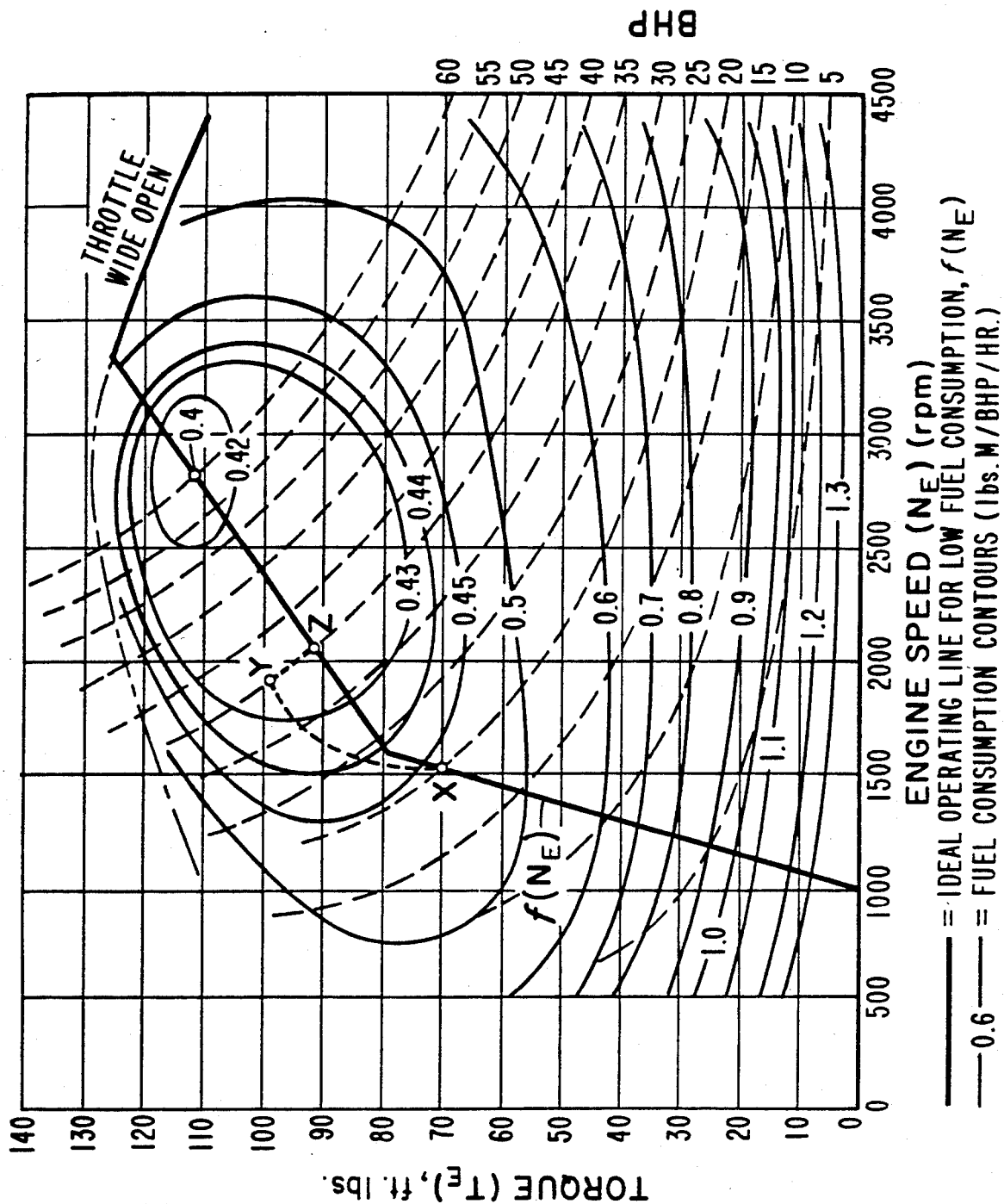
FIG. 1 is the performance map of a typical four cylinder passenger car engine having a displacement of approximately 2.5 liters.
Figure 2:
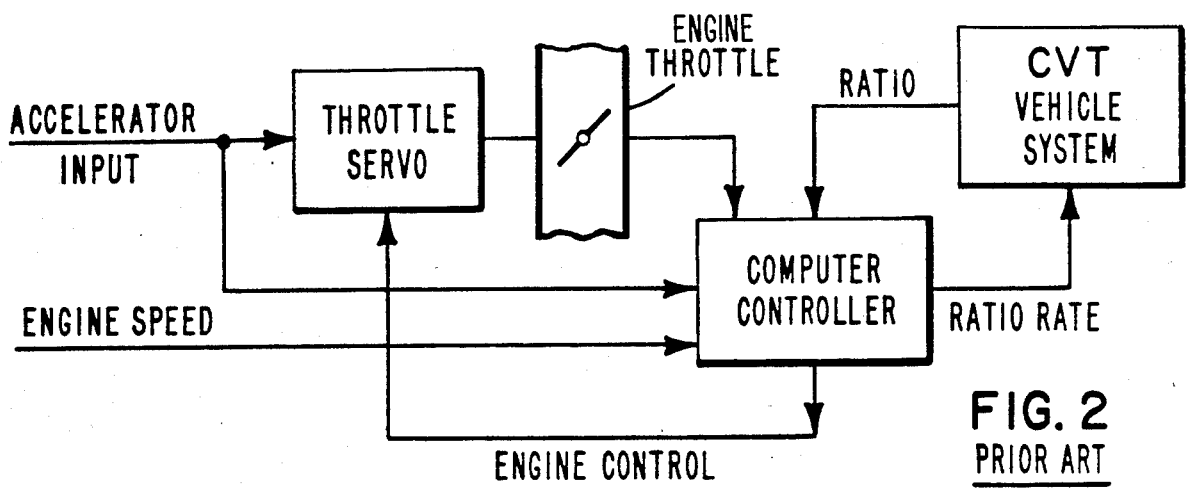
FIGS. 2 and 3 illustrate two forms of prior art engine-CVT control schemes.
Figure 3:
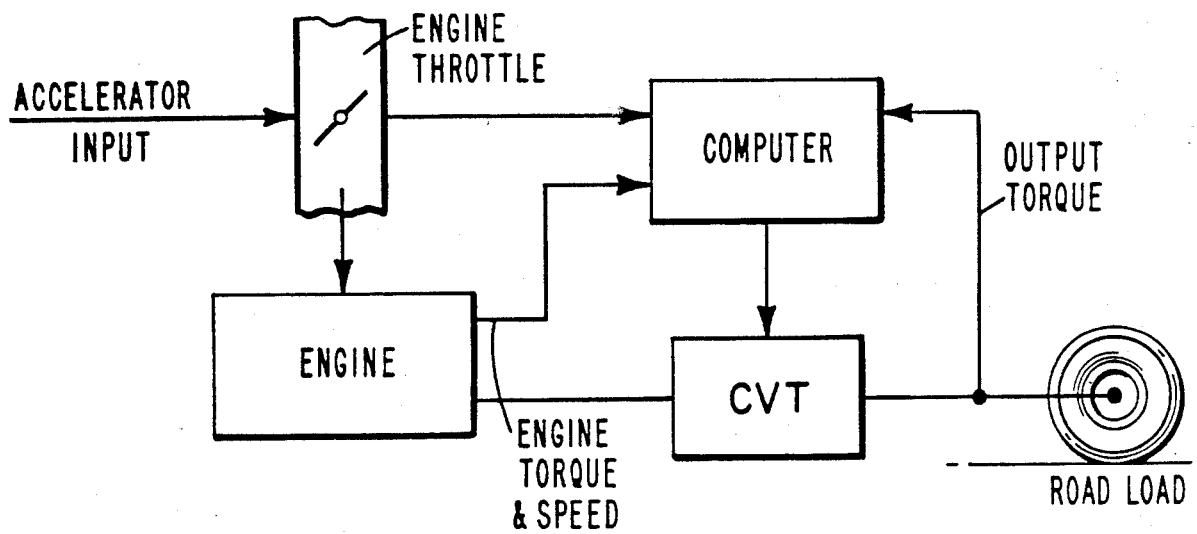
Figure 8:
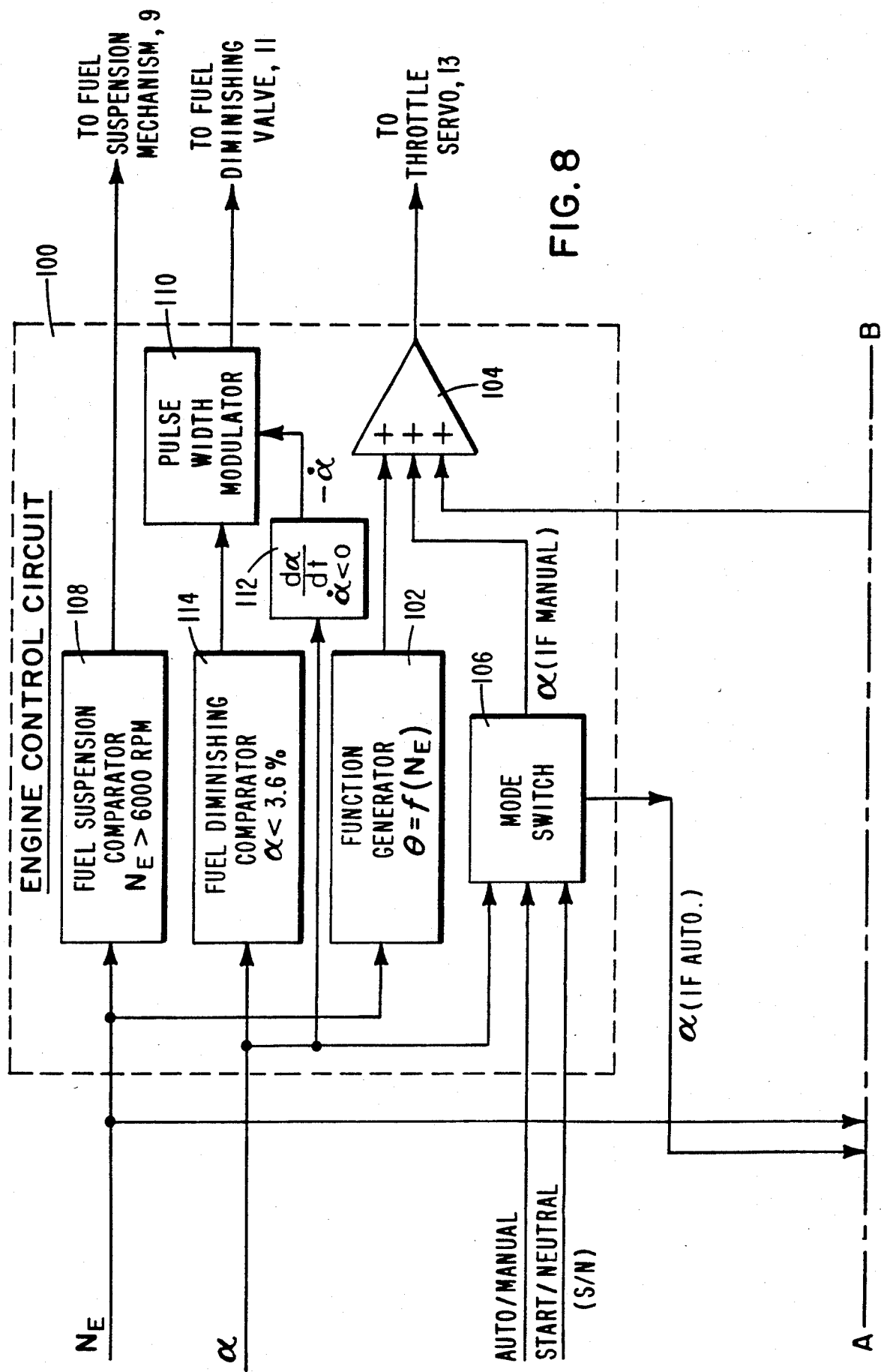
FIGS. 8 and 9 together schematically represent the engine and starting clutch scheme according to the invention, the figures being interrelated as indicated therein by lines A-B and C-D.
Figure 9:
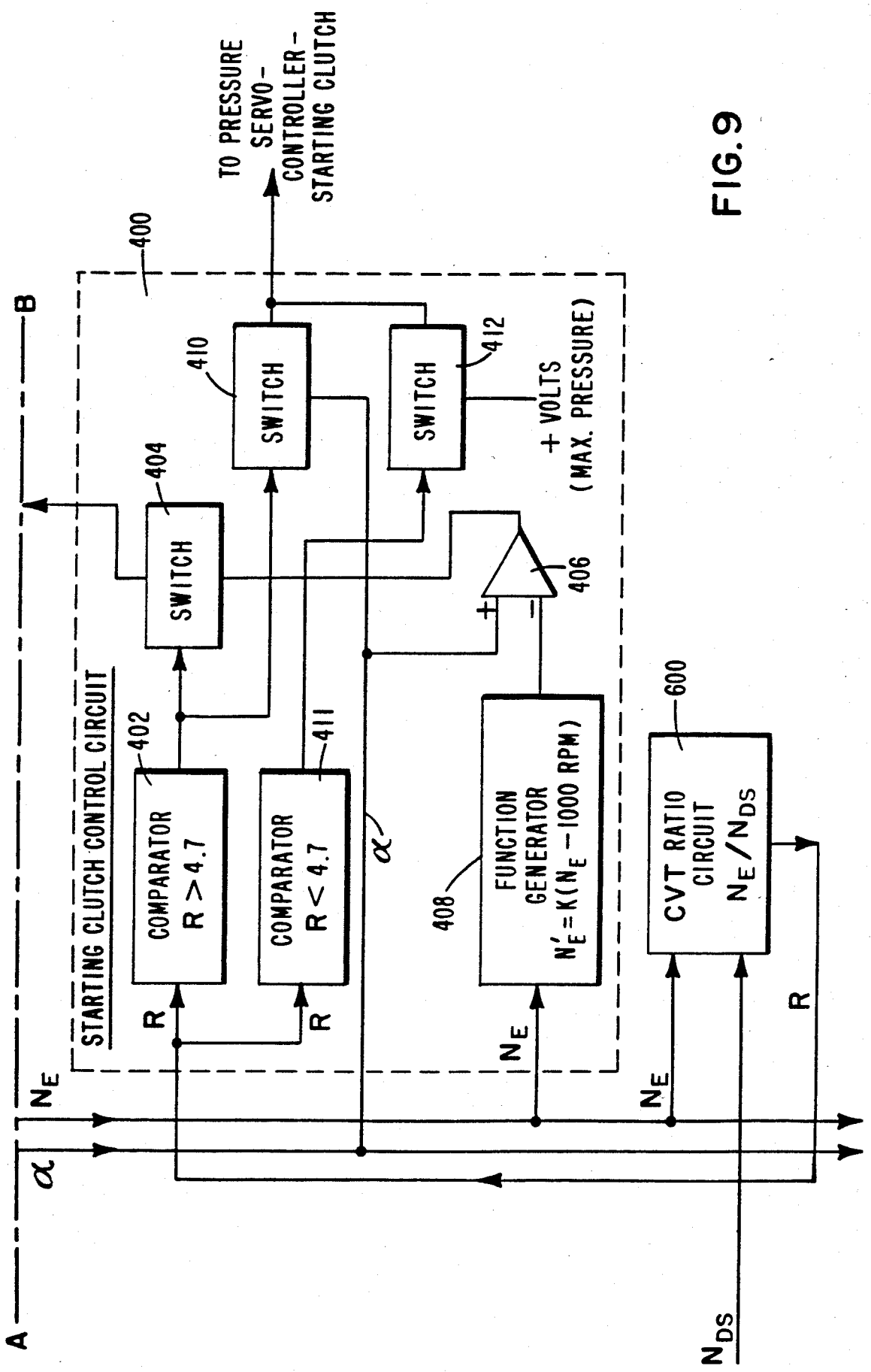

FIGS. 8 and 9 schematically illustrate in greater detail the functional relationships of several of the components illustrated in FIG. 5. FIG. 8 is primarily directed to the engine control circuit 100. A key element of control circuit 100 is function generator 102, which may generate a function representative of any desired engine operating characteristic. For this embodiment the function $\theta$ is chosen as the ideal engine operating line for low fuel consumption. $\theta$ represents throttle angle, which is proportional to deisred engine output torque. FIG. 1 graphically illustrates this function as $f(N_E)$. The value of the function produced by generator 102 is fed directly to throttle servo 13 via amplifier 104. In the event the automatic control system is disabled, it is possible to switch to a manual mode through mode switch 106. In the manual mode, accelerator postion $\alpha$ is directly communicated to throttle servo 13 via amplifier 104. The start/neutral switch S/N also operates through mode switch 106.

A fuel suspension comparator 108 provides backup engine overspeed control, which may tend to occur upon vigorous acceleration, if there is a malfunction in the control system, or if belt 15 or clutch 4 should fail. Primary engine overspeed control is afforded by the hydromechanical transmission ratio control system which is described below. Comparator 108 compares engine speed $N_E$ to the maximum permissible engine speed, for example 5500 rpm. If $N_E$ is greater than 6000 rpm, fuel suspension mechanism 9 is activated to suspend delivery of fuel to engine 10. Fuel suspension mechanism 9 may be, for example, a solenoid cutoff valve.

Another engine speed control is provided to counteract the inherent tendency of the vehicle to speed up when the accelerator pedal is released. This phenomenon occurs because the vehicle inertia becomes coupled to the inertia of a relatively unthrottled engine through a transmission whose ratio is changing towards overdrive. This undesirable tendency is even more pronounced when the accelerator pedal is released suddenly and completely. This anomalous behavior is prevented by reducing fuel flow to the engine when pressure on the accelerator pedal is relieved, the reduction of fuel flow being proportional to the rate at which pedal position decreases ($-\dot{\alpha}$), and by reducing fuel flow even further when the accelerator pedal position $\alpha$ drops below 3.6% of full excursion. To accomplish this control, a pulse width modulator 110 controls fuel diminishing valve 11, the duty cycle (i.e., the percentage of the pulse cycle during which the fuel diminishing valve is held open) of modulator 110 being inversely proportional to the rate at which pedal position $\alpha$ decreases ($-\dot{\alpha}$). $-\dot{\alpha}$ is derived from a differentiator 112 only if $\alpha$ is less than zero. In addition, a fuel diminishing comparator 114 reduces the duty cycle of modulator 110 to zero or nearly to zero when pedal position $\alpha$ drops to below 3.6%.

FIG. 9 relates primarily to the starting clutch control circuit 400. It will be appreciated that some type of coupling must be provided between the engine and the CVT in order to permit the engine to idle while the vehicle is stationary. A fluid coupling could be used, but the mechanical losses inherent in such a device are antithetical to the desired objective of maximizing fuel economy. A torque converter with a lock-up clutch would be an improvement, but a mechanical clutch is preferred, and one which is hydraulically actuated would be well suited for this purpose. The object here, as in the conventional automobile, is to totally disengage the clutch when the vehicle is stationary, and to gradually engage it to begin vehicle movement and progressively engage the clutch further as the vehicle speed increases. To this end the measured transmission ratio R (which is computed as the quotient of engine speed $N_E$ and drive shaft speed $N_{DS}$ by ratio circuit 600) is fed to a comparator 402. Comparator 402 closes switch 404 when R exceeds 4.7 to deliver the signal from amplifier 406 to throttle servo 13 via amplifier 104. This signal is equal to $\alpha - N_{E'}$, where $N_{E'}$ is a function produced by generator 408 equal to K ($N_E - 1000$ rpm). Thus, the accelerator pedal 118 is coupled directly to throttle 12 in a variable way defined by $\alpha - N_{E'}$. The constant K is selected such that engine speed cannot exceed 2500 rpm if the clutch is not fully engaged. This direct coupling of accelerator pedal to throttle allows an input to be provided to the system to initiate movement of the vehicle from a stationary position.

Comparator 402 also closes switch 410 to transmit pedal position $\alpha$ directly to the clutch pressure servo controller 450. Hence, the degree of engagement of clutch 40 is proportional to pedal position up to the point where ratio R equals 4.7. During this period the degree of direct control of the accelerator pedal over throttle 12 diminishes as engine speed increases in accordance with the above-described relationship.

When ratio R drops below 4.7, switches 404 and 410 open, and comparator 411 closes switch 412 to deliver maximum pressure to the clutch servo controller 450. Maximum pressure causes full engagement of the clutch. As the vehicle accelerates beyond this point, it is under total automatic control.

It can be seen that if no start/neutral S/N switch where provided, any depression of accelerator pedal 18 upon startup would cause engagement of clutch 40 and a forward lurch of the vehicle. The S/N switch therefore effectively disables the effect of $\alpha$ on clutch 40 to permit safe startup.

The driver sheave control system now will be described with reference to the lower portion of FIG. 5. A fluid source 300 supplies pressurized hydraulic fluid at a pressure $P_L$ to the various components of the system. These components include a driver control valve 310 for controlling the flow of fluid to and from actuation chamber 36 of driver sheave 30. Commands of the operator of the vehicle are input into the system by the accelerator pedal 18 which acts on pedal sensitive valve 320. Pedal sensitive valve 320 is mechanically coupled to driver control valve 310 and movable driver flange 34 to in effect form a proportional controller (described more fully below) for driver sheave 30. The sensitivity of the accelerator pedal is modulated under certain conditions by the action of an offset governor 350 which converts a regulated fluid pressure from regulator valve 302 to a pressure $P_G$ which varies as the square of drive shaft speed $N_{DS}$ (in accordance with FIG. 7) when drive shaft speed exceeds the predetermined "fast operation" value of 1173 rpm. As explained more fully below, the effect of pressure $P_G$ on pedal sensitive valve 320 is to diminish the mechanical displacement applied to driver control valve 310 so that the sensitivity of the accelerator pedal is diminished during relatively fast vehicle operation. Pressure $P_G$ also is the primary control which prevents the engine from exceeding its predetermined maximum operating speed, here 5500 rpm. Minimum engine speed (here 1000 rpm) is maintained by a pulse generator 370 and a switching modulator 380 which together cooperate to apply a pulsating modulating pressure $P_M$, the duty cycle of which is proportional to the drop in engine speed below the minimum 1000 rpm to effect a proportional increase in transmission ratio, thereby decreasing the load on the engine and permitting it to speed up.

Provision is made for adjusting the sensitivity of accelerator pedal 18, depending on vehicle speed, in order to more closely simulate the "feel" of a conventional vehicle. This is required because of the inherent operating characteristics of the engine and CVT. That is, at higher vehicle speeds, the torque produced by the engine remains fairly high and constant (see FIG. 1). In the conventional vehicle the remaining small percentage of torque which can be extracted from the engine is delivered to the rear wheels through a transmission in high gear with a fixed, very low reduction ratio. Vehicle acceleration is therefore fairly insensitive to accelerator pedal movement at high speeds. In a CVT equipped vehicle, however, depression of the accelerator pedal even at high vehicle speeds would result in an increased reduction ratio and an associated multiplication of torque in excess of that provided in the conventional vehicle. Thus, if only direct accelerator pedal position α were used to control CVT ratio at higher vehicle speeds, vehicle response would be extremely sensitive to accelerator pedal movement. The sensitivity of the accelerator pedal 18 must therefore be dulled at higher vehicle speeds.

Referring to FIG. 6A, driver control valve 310 is a known type of servo valve having a spool 312 which controls the flow of hydraulic fluid to and from driver actuation chamber 36 via ports 314 and 316 respectively. Thus, spool 312 has a piston 318 which controls the flow of pressurized fluid $P_L$ entering the valve through port 319. Piston 317 controls the flow of fluid draining from valve 310 through port 315. An additional port 313 admits modulating pulsating fluid pressure $P_M$ into valve 310 to act on piston 311, which has a larger exposed surface area than piston 317, and urge spool 312 to the left. As explained below, this occurs only when the speed of the engine drops below the minimum operating speed of 1000 rpm.

As illustrated in FIG. 6A, spool 312 is in a position such that ports 315 and 319 are blocked, isolating the fluid in driver actuation chamber 36. Piston 33 and movable driver flange 34 are therefore immobilized. A change of transmission ratio will occur if spool 312 is moved either to the left or to the right. If moved to the right, piston 318 uncovers port 319 to permit pressurized fluid to enter valve 310 and actuation chamber 36 via port 314. This will force piston 33 to the left, thereby increasing the driving diameter of driver sheave 30 and decreasing the transmission ratio. Conversely, if spool 312 is moved to the left from the position illustrated in FIG. 6A, port 319 will remain covered by piston 318, but piston 317 will uncover drain port 315, allowing fluid to drain from actuation chamber 36 via ports 316 and 315. This will permit piston 33 to move to the right, reducing the driving diameter of driver sheave 30 and increasing the transmission ratio. Of course, whenever a change in driving diameter occurs with respect to driver sheave 30, an inverse change of drive diameter occurs with respect to driven sheave 20.

Movement of spool 312 is effected primarily by the displacement output of command actuator or pedal sensitive valve 320 acting on a link 304 which pivotally interconnects movable driver flange 34 at coupling 305, spool 312 at 306, and pedal sensitive valve 320 at 307. This arrangement forms a proportional controller for driver sheave 30, the gain of which is equal to the lever ratio of the length of link 304 between pivots 305 and 306 to the length of link 304 between pivots 306 and 307. Thus, an initial displacement at pivot 307 will effect an immediate displacement at pivot 306 to move spool 312 and cause a change in fluid volume in actuation chamber 36. This change will result in movement of movable driver flange 34, causing movement of link 304 at pivot 305 in a direction opposite to the initial displacement at pivot 307. With pivot 307 held substantially fixed at its new position, pivot 306 also will move in the same direction as pivot 305, thereby returning spool 312 to the steady state position illustrated in FIG. 6A.

Command actuator or pedal sensitive valve 320 compliantly couples the accelerator pedal 18 to link 304, and also permits modulation of the commanded power or torque as a function of the vehicle speed (drive shaft speed $N_{DS}$) so as to decrease the sensitivity of the accelerator pedal during relatively fast vehicle operation. Pedal sensitive valve 320 comprises a housing 322 having a central bore 324 in which are coaxially slidably received a command piston 326 and a follower piston 328. A retaining clip 330 prevents further right hand movement of piston 326, while a retaining clip 332 prevents further right hand movement of piston 328 past the null position illustrated in FIG. 6A. Pistons 326 and 328 are divergently biased by means of a compression compliance spring 334. A compression spring 336 urges piston 328 towards its null position. Movement of command piston 326 will effect compliant movement of follower piston 328 to effect a smooth actuation of change in transmission ratio.

A modulating chamber 338 in housing 322 exposes the left face of follower piston 328 to fluid pressure $P_G$ via port 340. Fluid pressure $P_G$ in chamber 338 urges follower piston 328 to the right contrary to the leftward movement of command piston 326. The net result of this counteracting force is to diminish the sensitivity of the accelerator pedal. Pressure $P_G$ is generated by offset governor 350 (FIG. 6B), which is a centrifugal force responsive hydraulic valve coupled to output shaft 316. Offset governor 350 comprises a housing 352 which spins with output shaft 316. A spool 354 is axially movable within housing 352 and is biased inwardly toward the center of output shaft 16 by a return spring 356. An inlet port 358 receives line pressure $P_L$ from regulator valve 302. A drain port 360 passes draining fluid. A feed piston 362 on spool 354 controls the flow of hydraulic fluid into housing 352 via port 358, while a drain piston 364 controls the drain of fluid via port 360. Fluid feeds to and drains from modulating chamber 338 via port 366 in housing 352.

In operation, centrifugal force acting on spool 354 forces it radially outwardly against the action of spring 356 until, at a threshold "fast operation" drive shaft speed of 1173 rpm, piston 362 clears port 358 and begins to meter hydraulic pressure $P_G$ to modulating chamber 338. Pressure $P_G$ is proportional to the square to of drive shaft speed in accordance with the curve of FIG. 7. Thus, as vehicle speed increases, the sensitivity of the accelerator pedal diminishes so as to simulate the "feel" of a conventional vehicle. As long as vehicle speed is below a threshold equivalent of drive shaft speed $N_{DS}$ equal to or less than 1173 rpm, $P_G$ equals zero and control is effectively torque control. When drive shaft speed $N_{DS}$ exceeds 1173 rpm, $P_G$ becomes positive to more closely simulate the pedal response in a conventional automobile. This effectively is power control. As vehicle speed increases to the point where engine speed approaches its maximum permissible value of 5500 rpm, the value of $P_G$ is large enough to hold follower piston 328 at or close to its null position, thereby decreasing the transmission ratio irrespective of pedal position $\alpha$ to increase the load on the engine and prevent overspeed.

Referring to FIG. 6B, engine underspeed is prevented by pulse generator 370 in cooperation with switching modulator 380. Pulse generator 370 compares the actual measured engine speed $N_E$ to the minimum permissible engine speed of 1000 rpm and generates pulses only if $N_E$ is less than 1000 rpm. The duty cycle of pulse generator 370 is proportional to the drop in engine speed below 1000 rpm. Switching modulator 380 acts as a transducer to convert the electrical pulses of pulse generator 370 into pulses of hydraulic pressure $P_M$ delivered to driver control valve 310, as explained above. Switching modulator 380 comprises a casing 382 having a spring-loaded piston 384, a ferrous core member 386 and a magnetic coil 388. Core member 386 and coil 388 act as a solenoid when energized to urge piston 384 to the right away from a stop 390 against the action of spring 392. Piston 384 will oscillate under the influence of pulsating current from pulse generator 370, thereby pulsatingly passing hydraulic fluid from port 394 to port 313 of driver control valve 310 via port 396 and orifice 398. The net modulating pressure $P_M$ applied to piston 311 to decrease the driving diameter of the driver sheave and decrease the load on the engine is therefore directly proportional to the duty cycle of pulse generator 370.

The instant invention involves, in part, the recognition that control of the ratio rate $\dot{R}$ of the CVT, rather than merely the CVT ratio, yields improved CVT control. This improved control is explained by reference to the following derived vehicle performance equation:

$$\dot{N}_{DS} = \frac{-\dot{R} I_E N_E}{I_{EQ}} + \frac{RT_E - T_{RL} - T_{loss}}{I_{EQ}}$$

where
$I_{EQ} = I_{CDS} + R^2 I_E$,
$\dot{R}$ is the ratio rate of the transmission,
R is the ratio of the transmission,
$I_E$ is engine inertia,
$N_E$ is engine speed, $T_E$ is engine torque,
$T_{RL}$ is road load torque reflected to the drive shaft and includes tires, final drive and axle losses,
$T_{loss}$ is transmission loss,
$I_{CDS}$ is car inertia reflected to the drive shaft, and
$\dot{N}_{DS}$ is vehicle acceleration measured at the drive shaft.

It is clear that the acceleration of the vehicle $\dot{N}_{DS}$ is dependent primarily upon control of any one or more of these variables such as, for example, $T_E$, R or $\dot{R}$. Generally, conventional vehicle systems vary the transmission ratio R and engine output torque $T_E$ to provide the required transmission and vehicle control. By controlling R, however, it is difficult to constantly maintain engine torque and speed along the ideal operating line. This is due to the fact that each time R is varied, the load on the engine is changed which, in turn, affects the engine's output torque and vehicle acceleration.

Attempts to simultaneously change the engine torque and speed to force engine operation back on the ideal line have necessitated very complex control systems, since control is dependent on several variables of the performance system. For example, these systems must necessarily perform the complicated task of calculating the necessary target throttle position and CVT ratio R to force engine operation back on the ideal line. These systems also require the calculation of ratio rate $\dot{R}$ so that the rate in changing the ratio to the target value does not result in undesirable vehicle dynamics. For example, if $\dot{R}$ is selected to be excessive then an undesirable deceleration of the vehicle will occur before the vehicle can accelerate. This phenomenon results from the negative sign of the $\dot{R}$ term in the above performance equation.

This invention, however, recognizes that $\dot{R}$ can easily be sensed and controlled without causing the other variables to adversely affect engine performance. This is accomplished by separating the engine control from the transmission control so that engine torque and speed are fixed along the ideal engine operating line. As a result of controlling $\dot{R}$ no adverse effect on the other dependent variables occurs. In particular, changing $\dot{R}$ alone, with its concomitant change on R, will not force engine operation off the ideal operating line since engine speed and torque are determined solely by the fuel function $f(N_E)$. As a result, vehicle acceleration $\dot{N}_{DS}$ and output torque $T_O$ are controlled solely by ratio rate $\dot{R}$, rather than by the other variables of the performance system.

It has been discovered in accordance with this invention that rate of change of ratio ($\dot{R}$) is closely approximated by the following relationships:

$k \dot{R} = \alpha - T_O$ (for low speeds: torque control) and $$k\dot{R} = \frac{\alpha}{k'N_{DS}} - T_O \text{ for high speeds: power control)}$$

In the V-belt traction drive CVT of the preferred embodiment of the invention, the comparison of accelerator pedal position α and output torque $T_O$ occurs inherently in the belt and pulley components to effect a ratio change at a rate $\dot{R}$. Other types of CVTs may require different control elements to effect this relationship. As stated earlier, however, other parameters indicative of system performance may be used to effect a ratio change at a rate $\dot{R}$, where $\dot{R}$ is proportional to the difference between the desired performance parameter and the actual measured performance parameter.

Figure 10:
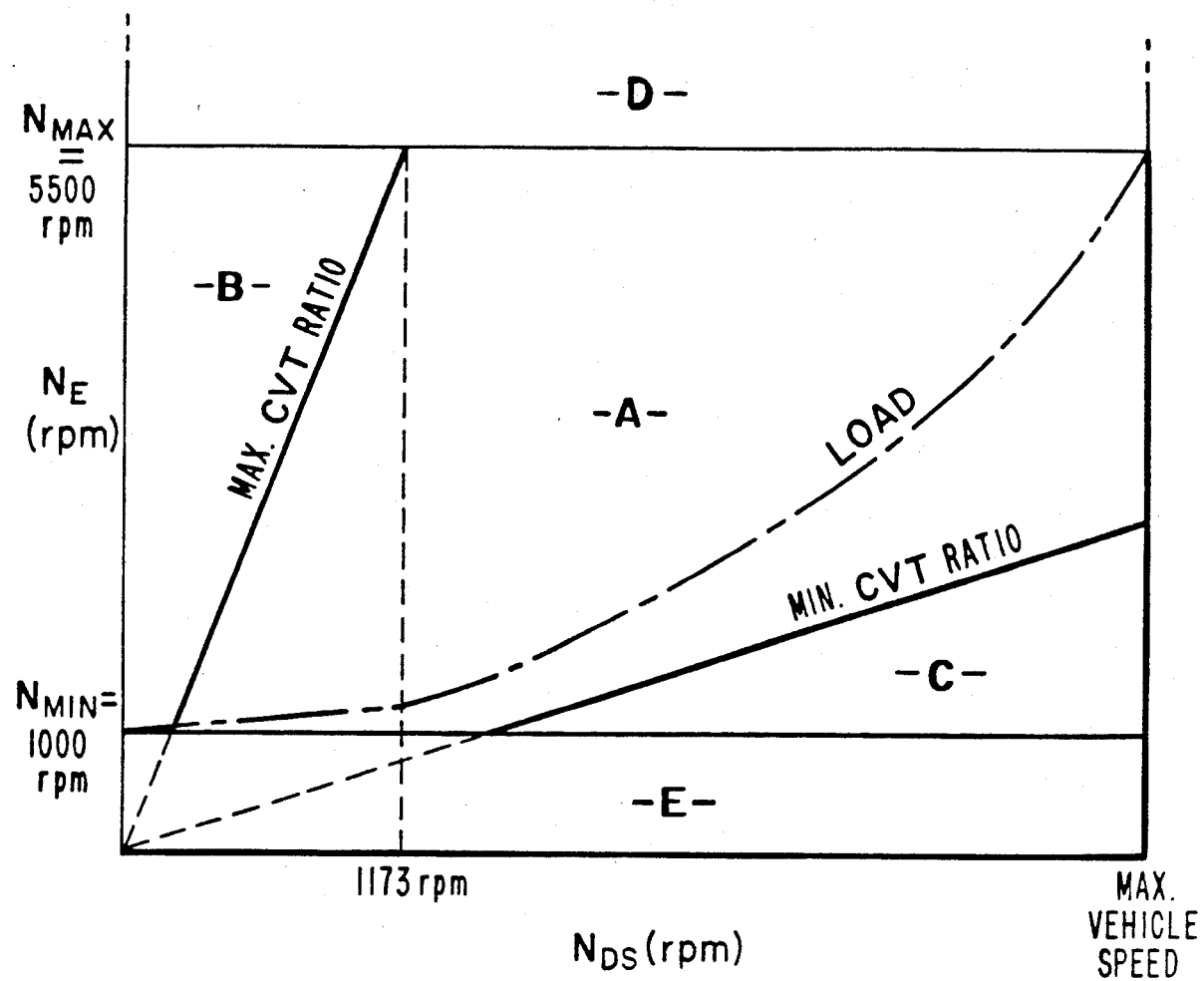
FIG. 10 is a graphical representation of the operation of an engine-CVT system in accordance with the control scheme of the invention.

The above described control scheme of the invention is graphically illustrated in FIG. 10. FIG. 10 is a plot of engine speed $N_E$ as a function of vehicle speed or drive shaft speed $N_{DS}$. The minimum and maximum CVT ratios are illustrated by the straight line emanating from the origin of the graph. The idle speed ($N_{MIN}=1000$ rpm) is indicated by a lower horizontal line, while the maximum permissible engine speed ($N_{MAX}=5500$ rpm) is indicated by an upper horizontal line. The maximum vehicle speed is defined by a vertical line at the right hand edge of the graph.

Figure 7:
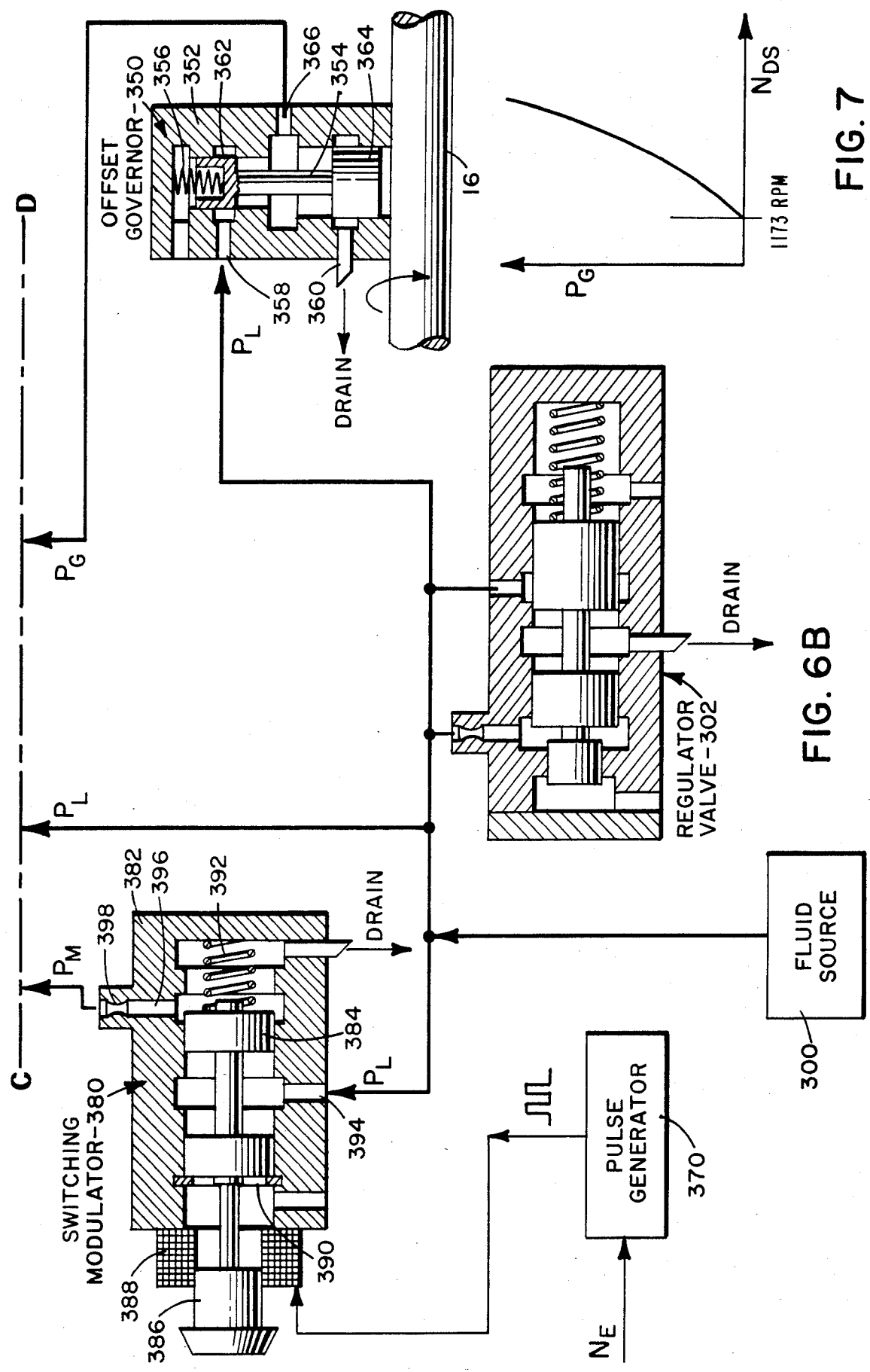
FIG. 7 is a plot of hydraulic pressure as a function of output shaft speed, a characteristic of the offset governor which modulates the sensitivity of the accelerator pedal and prevents engine overspeed.

The graph of FIG. 10 is divided into a number of discrete operating regions. "A" designates the normal region of operation of the engine-CVT system. Region "A" is bounded by the line of maximum CVT ratio, the line of maximum engine speed, the line of maximum vehicle speed, the line of minimum CVT ratio and the idle speed line. During operation of the system in region "A", clutch 40 is fully engaged and throttle position is wholly a function of engine speed in accordance with the fuel function $f(N_E)$. Operation to the left of the dashed vertical line indicating a drive shaft speed of 1173 rpm is under torque control, while operation to the right of this line is under power control (see the above two equations, and the accelerator pedal sensitivity adjustment afforded by offset governor 350: FIGS. 5, 6B and 7). Region "B" is the region of start-up control, that is, the operation of the engine-CVT system during slow vehicle operation when clutch 40 is only partially engaged. The control for this operation (400) is illustrated in FIG. 9.

Operation of the engine-CVT system in the remaining three regions "C", "D", and "E" is effectively prevented by the above described control system. That is, operation in region "C" is prevented by the physical limitation of minimum CVT ratio, and by the fuel diminishing circuits comprising fuel diminishing valve 11, pulse width modulator 110, differentiator 112 and fuel diminishing comparator 114 of engine control circuit 100 (FIG. 8). Region "D" is the region of overspeed control, governed by the hydromechanical transmission ratio control system, including offset governor 350, the fuel suspension mechanism 9 and fuel suspension comparator 108 of engine control circuit 100 (FIG. 8). Region "E" is the region of engine idle control which is governed by pulse generator 370 and switching modulator 380 (FIG. 6B).

Also shown on the graph of FIG. 10 is a load line which indicates the engine speed required to maintain any constant vehicle speed along a level road. The term "load" includes road load, final drive losses and the like, and represents the actual load on the engine-CVT system. In order for the control scheme of the invention to function only in accordance with the fuel function so as to maintain engine operation along the ideal operating line, it is desirable that the CVT ratio range include substantially all ratios required to maintain constant vehicle speed for any normally encountered load. That is, the minimum CVT ratio preferably is smaller than that required to maintain constant vehicle speed along a level road, and the maximum CVT ratio preferably is greater than that required to maintain constant vehicle speed up the steepest grade which one might expect to encounter. This relationship is graphically illustrated by the physical location of the load line in the graph of FIG. 10 above the line of minimum CVT ratio in region "A". All other load lines should lie below the line of maximum CVT ratio. A desirable CVT ratio range for accomplishing this is approximately 11:1 with, for example, a maximum CVT ratio of 22:1 (total vehicle ratio, including final drive ratio), and a minimum CVT ratio of 2:1. A transmission having such a wide ratio range is disclosed in commonly assigned application Ser. No. 290,293, filed Aug. 5, 1981. Of course, a CVT having smaller ratio range would be operable, but would not have as much flexibility as one with a wider range.

The above-described control scheme quite simply and effectively accomplishes its primary objective of maintaining engine operation along the ideal operating line, for example, that of minimum fuel consumption. Transmission control requires output torque and accelerator pedal position sensing, while engine control requires only engine speed sensing. Simple direct hydraulic control of the driver sheave and inherent resulting mechanical control of the driven sheave (by a simple mechanical torque ramp) eliminates the need for the complex hydraulic pressure proportioning system formerly required for controlling hydraulically actuated driver and driven sheaves. The specific parameter values set forth in the preferred embodiment described above are in no way intended to limit the scope of the invention, it being apparent that these parameters will vary in accordance with engine, transmission and vehicle design, and desired behavior and performance. Numerous modifications of the invention will be apparent to those skilled in the art without departing from the true spirit and scope of the invention which is defined by the appended claims.

We claim:

1. A method of controlling the operation of a power delivery system including a prime mover and a continuously variable ratio transmission coupled to said prime mover for delivering power from said prime mover to an output shaft, said transmission having adjustable driver means operatively coupled to said prime mover for adjustably transmitting power from said prime mover, and adjustable driven means operatively coupled to said driver means and to said output shaft for adjustably transmitting power from said driver means to said output shaft, the ratio of said transmission being determined by the relative adjustments of said driver means and said driven means, said prime mover having fuel delivery means for delivering a variable quantity of fuel thereto, said power delivery system being controlled by command means for commanding a desired system performance, the method comprising the steps of:

measuring the actual performance of the power delivery system;

controlling the ratio of said transmission as a function of the desired system performance commanded by said command means and said measured actual system performance, the speed of said prime mover varying as a function of transmission ratio, the step of controlling the transmission ratio comprising:

controlling the adjustment of said driver means as a function of the desired system performance commanded by said command means; and controlling the adjustment of said driven means as a function of said measured actual system performance; predetermining a fuel function defining desired fuel requirements for said prime mover in relation to prime mover operating speed;

measuring the speed of said prime mover; and controlling said fuel delivery means only in accordance with said fuel function so that the quantity of fuel delivered to said prime mover is determined only by the speed thereof.

2. The method of claim 1 wherein the step of controlling the ratio of said transmission comprises changing the ratio of said transmission at a rate which is proportional to the difference between the desired system performance and the actual measured system performance.

3. The method of claim 1 wherein the desired system performance commanded by said command means is desired output power or torque delivered to said output shaft, and the actual measured system performance is actual measured torque delivered to said output shaft.

4. The method of claim 3 wherein the step of controlling the ratio of said transmission comprises:

changing the ratio of said transmission at a rate which is proportional to the difference between the power or torque commanded by said command means and said measured output torque.

5. The method of claim 3 wherein the step of controlling the transmission ratio further comprises decreasing the ratio to increase the load on the prime mover as the speed of the prime mover approaches a predetermined maximum operating speed.

6. The method of claim 3 wherein the step of controlling the transmission ratio further comprises increasing the ratio to decrease the load on the prime mover if the measured speed of the prime mover falls below a predetermined minimum permissible operating speed.

7. The method of claim 3 wherein said prime mover is the engine of an engine-driven vehicle, the method further comprising the step of decreasing the sensitivity of said command means during relatively fast vehicle operation.

8. The method of claim 7 further comprising:

measuring the speed of said output shaft;

comparing said measured output shaft speed to a predetermined fast operation threshold value; and controlling the transmission ratio as a function of said measured output torque and output torque commanded by said command means, the commanded output torque being diminished by a value which is a function of measured output shaft speed when said measured output shaft speed exceeds said fast operation threshold value, so that said power delivery system responds to commanded power during relatively fast vehicle operation and responds to commanded torque during slower vehicle operation.

9. The method of claim 8 wherein said value by which said commanded output torque is diminished is proportional to the square of output shaft speed.

10. The method of claim 3 wherein said fuel function is the prime mover ideal operating line for low fuel consumption.

11. The method of claim 3 wherein prime mover is an internal combustion engine.

12. The method of claim 11 wherein said fuel delivery means comprises a throttle.

13. The method of claim 3 wherein said prime mover is the engine of an engine-driven vehicle.

14. The method of claim 13 wherein said fuel delivery means comprises a throttle.

15. The method of claim 3 wherein the transmission provides substantially all ratios required to maintain constant output shaft speed for any normally encountered load while said fuel delivery means is controlled only in accordance with said fuel function.

16. The method of claim 3 wherein said transmission is a V-belt traction drive transmission, said driver means and said driven means are adjustable sheaves having variable drive diameters and are coupled by a V-belt, the step of controlling the adjustment of said driver means comprises controlling the drive diameter of the driver sheave, and the step of controlling the adjustment of said driven means comprises controlling the drive diameter of the driven sheave.

17. A system for controlling the operation of a power delivery system including a prime mover and a continuously variable ratio transmission coupled to said prime mover for delivering power from said prime mover to an output shaft, said transmission having adjustable driver means operatively coupled to said prime mover for adjustably transmitting power from said prime mover, and adjustable driven means operatively coupled to said driver means and to said output shaft for adjustably transmitting power from said driver means to said output shaft, the ratio of said transmission being determined by the relative adjustments of said driver means and said driven means, said prime mover having fuel delivery means for delivering a variable quantity of fuel thereto, said power delivery system being controlled by command means for commanding a desired power delivery system performance, the control system comprising:

actual system performance measuring means for measuring the actual performance of the power delivery system;

ratio control means operatively coupled to said command means and said actual system performance measuring means for controlling the ratio of said transmission as a function of the desired system performance commanded by said command means and the meausred actual system performance, the speed of said prime mover varying as a function of transmission ratio, the ratio control means comprising:

driver control means operatively coupled to said driver means and to said command means for controlling the adjustment of said driver means as a function of the desired system performance commanded by said command means; and driven control means operatively coupled to said driven means and to said actual system performance measuring means for controlling the adjustment of said driven means as a function of said measured actual system performance;

fuel function means defining a desired fuel requirement for said prime mover in relation to prime mover operating speed;
speed measuring means for measuring the speed of said prime mover; and
fuel control means operatively coupled to said fuel function means and said fuel delivery means for controlling said fuel delivery means only in accordance with the fuel requirements defined by said fuel function means, so that the quantity of fuel delivered to said prime mover is determined only by the speed thereof.

18. The system of claim 17 wherein said ratio control means changes the ratio of said transmission at a rate which is proportional to the difference between the desired system performance and the actual measured system performance.

19. The system of claim 17 wherein the desired system performance commanded by said command means is desired output power or torque delivered to said output shaft, and the actual measured system performance is actual measured torque delivered to said output shaft.

20. The system of claim 19 wherein said ratio control means changes the ratio of said transmission at a rate which is proportional to the difference between the power of torque commanded by said command means and said measured output torque.

21. The system of claim 19 further comprising overspeed prevention means operatively coupled to said ratio control means for decreasing the ratio of said transmission to increase the load on said prime mover as the speed of the prime mover approaches a predetermined maximum operating speed.

22. The system of claim 19 further comprising underspeed prevention means operatively coupled to said speed measuring means and to said driver control means for increasing the ratio of said transmission to decrease the load on said prime mover if the measured speed of the prime mover falls below a predetermined minimum permissible operating speed.

23. The system of claim 22 wherein the rate at which said underspeed prevention means increases the transmission ratio is proportional to the drop in prime mover speed below said predetermined minimum permissible operating speed.

24. The system of claim 23 wherein said driver means is hydraulically actuated, said driver control means includes an hydraulic control valve which directs hydraulic fluid to or from said driver means when said driver means is to be adjusted, and said underspeed prevention means measures the drop in prime mover speed as an hydraulic pressure and applies said pressure to said control valve to adjust said driver means.

25. The system of claim 24 wherein said underspeed prevention means comprises an electrical pulse generator operatively coupled to said speed measuring means, the duty cycle of said pulse generator being proportional to the drop in prime mover speed below said predetermined minimum permissible operating speed, and a transducer operatively coupled to said pulse generator and said control valve for converting electrical pusles to pulses of hydraulic fluid pressure.

26. The system of claim 25 wherein said transducer comprises a solenoid-actuated hydraulic modulator valve.

27. The system of claim 19 wherein said prime mover is the engine of an engine-driven vehicle, further comprising sensitivity adjusting and overspeed prevention means operatively coupled to said driver control means and said output shaft for decreasing the sensitivity of said command means during relatively fast vehicle operation, and decreasing the ratio of said transmission to increase the load on the engine as the speed of the engine approaches a predetermined maximum operating speed.

28. The system of claim 27 wherein said sensitivity adjusting and overspeed prevention means compares output shaft speed to a predetermined fast operation threshold value and diminishes the output torque commanded by said command means by a value which is a function of output shaft speed when the output shaft speed exceeds said fast operation threshold value, so that said power delivery system responds to commanded power during relatively fast vehicle operation, and responds to commanded torque during slower vehicle operation.

29. The system of claim 28 wherein said sensitivity adjusting and overspeed prevention means includes centrifugal force measuring means associated with said output shaft, the value by which said commanded output torque is diminished being proportional to the square of output shaft speed.

30. The system of claim 29 wherein said driver means is hydraulically actuated and said driver control means directs hydraulic fluid to or from said driver means when said driver means is to be adjusted, the degree of hydraulically actuated adjustment of said driver means being proportional to the net of the torque commanded by said command means and the diminishing value of said sensitivity adjusting and overspeed prevention means.

31. The system of claim 30 wherein said centrifugal force measuring means measures centrifugal force as an hydraulic pressure, and said driver control means includes an hydraulic control valve for directing hydraulic fluid to or from said driver means and a command actuator for said control valve, said command actuator comprising:
a hollow body having an input end, an output end, and an axial bore therethrough;
a command piston slidable in said bore adjacent said input end of said body and operatively coupled to said command means;
a follower piston slidable in said bore adjacent said output end of said body and operatively coupled to said control valve;
a compliance compression spring in said bore between and divergently biasing said command piston and said follower piston;
a return spring in said bore in engagement with and urging said follower piston toward said input end of said body to a null position; and
a modulating chamber adjacent the output end-facing side of said follower piston in fluid communication with said centrifugal force measuring means, the pressurized hydraulic fluid from said centrifugal force measuring means urging said follower piston toward said null position.

32. The system of claim 31 wherein said driver means, said control valve and said command actuator are mechanically linked together by a feedback link to form a proportional controller.

33. The system of claim 19 wherein said fuel function means defines the prime mover ideal operating line for low fuel consumption.

34. The system of claim 19 wherein said prime mover is an internal combustion engine.

35. The system of claim 34 wherein said fuel delivery means comprises a throttle.

36. The system of claim 19 wherein said prime mover is the engine of an engine-driven vehicle.

37. The system of claim 36 wherein said fuel delivery means comprises a throttle.

38. The system of claim 19 wherein the transmission provides substantially all ratios to maintain constant output shaft speed for any normally encountered load while said fuel delivery means is controlled only in accordance with said fuel function.

39. A power delivery system comprising:
a prime mover;
an output shaft for receiving power from said prime mover;
a continuously variable ratio transmission interconnecting said prime mover and said output shaft, said transmission having adjustable driver means operatively coupled to said prime mover for adjustably transmitting power from said prime mover, and adjustable driven means operatively coupled to said driver means and to said output shaft for adjustably transmitting power from said driver means to said output shaft, the ratio of said transmission being determined by the relative adjustments of said driver means and said driven means;
fuel delivery means for delivering a variable quantity to fuel to said prime mover;
command means for commanding a desired power delivery system performance;
actual system performance measuring means for measuring the actual performance of the power delivery system;
ratio control means operatively coupled to said command means and said actual system performance measuring means for controlling the ratio of said transmission as a function of the desired system performance commanded by said command means and the measured actual system peformance, the speed of said prime mover varying as a function of transmission ratio, the ratio control means comprising:
driver control means operatively coupled to said driver means and to said command means for controlling the adjustment of said driver means as a function of the desired system performance commanded by said command means; and
driven control means operatively coupled to said driven means and to said actual system performance measuring means for controlling the adjustment of said driven means as a function of said measured actual system performance;
fuel function means defining a desired fuel requirement for said prime mover in relation to prime mover operating speed;
speed measuring means for measuring the speed of said prime mover; and
fuel control means operatively coupled to said fuel function means and said fuel delivery means for controlling said fuel delivery means only in accordance with the fuel requirement defined by said fuel function means, so that the quantity of fuel delivered to said prime mover is determined only by the speed thereof.

40. The system of claim 39 wherein said ratio control means changes the ratio of said transmission at a rate which is proportional to the difference between the desired system performance and the actual measured system performance.

41. The system of claim 39 wherein the desired system performance commanded by said command means is desired output power or toruqe delivered to said output shaft, and the actual measured system peformance is actual measured torque delivered to said output shaft.

42. The system of claim 41 wherein said ratio control means changes the ratio of said transmission at a rate which is proportional to the difference between the power or torque commanded by said command means and said measured output torque.

43. The system of claim 41 further comprising overspeed prevention means operatively coupled to said ratio control means for decreasing the ratio of said transmission to increase the load on said prime mover as the speed of the prime mover approaches a predetermined maximum operating speed.

44. The system of claim 41 further comprising underspeed prevention means operatively coupled to said speed measuring means and to said driver control means for increasing the ratio of said transmission to decrease the load on said prime mover if the measured speed of the prime mover falls below a predetermined minimum permissible operating speed.

45. The system of claim 44 wherein the rate at which said underspeed prevention means increases the transmission ratio is proportional to the drop in prime mover speed below said predetermined minimum permissible operating speed.

46. The system of claim 45 wherein said driver means is hydraulically actuated, said driver control means includes an hydraulic control valve which directs hydraulic fluid to or from said driver means when said driver means is to be adjusted, and said underspeed prevention means measures the drop in prime mover speed as an hydraulic pressure and applies said pressure to said control valve to adjust said driver means.

47. The system of claim 46 wherein said underspeed prevention means comprises an electrical pulse generator operatively coupled to said speed measuring means, the duty cycle of said pulse generator being proportional to the drop in prime mover speed below said predetermined minimum permissible operating speed, and a transducer operatively coupled to said pulse generator and said control valve for converting electrical pulses to pulses of hydraulic fluid pressure.

48. The system of claim 47 wherein said transducer comprises a solenoid-actuated hydralic modulator valve.

49. The system of claim 41 wherein said prime mover is the engine of an engine-driven vehicle, further comprising sensitivity adjusting and overspeed prevention means operatively coupled to said driver control means and said output shaft for decreasing the sensitivity of said command means during relatively fast vehicle operation, and decreasing the ratio of said transmission to increase the load on the engine as the speed of the engine approaches a predetermined maximum operating speed.

50. The system of claim 49 wherein said sensitivity adjusting and overspeed prevention means compares output shaft speed to a predetermined fast operation threshold value and diminishes the output torque commanded by said command means by a value which is a function of output shaft speed when the output shaft speed exceeds said fast operation threshold value, so that said power delivery system responds to commanded power during relatively fast vehicle operation, and responds to commanded torque during slower vehicle operation.

51. The system of claim 50 wherein said sensitivity adjusting and overspeed prevention means includes centrifugal force measuring means associated with said output shaft, the value by which said commanded output torque is diminished being proportional to the square of output shaft speed.

52. The system of claim 51 wherein said driver means is hydraulically actuated and said driver control means directs hydraulic fluid to or from said driver means when said driver means is to be adjusted, the degree of hydraulically actuated adjustment of said driver means being proportional to the net of the torque commanded by said command means and the diminishing value of said sensitivity adjusting and overspeed prevention means.

53. The system of claim 52 wherein said centrifugal force measuring means measures centrifugal force as an hydraulic pressure, and said driver control means includes an hydraulic control valve for directing hydraulic fluid to or from said driver means and a command actuator for said control valve, said command actuator comprising:
- a hollow body having an input end, an output end, and an axial bore therethrough;
- a command piston slidable in said bore adjacent said input end of said body and operatively coupled to said command means;
- a follower piston slidable in said bore adjacent said output end of said body and operatively coupled to said control valve;
- a compliance compression spring in said bore between and divergently biasing said command piston and said follower piston;
- a return spring in said bore in engagement with and urging said follower piston toward said input end of said body to a null position; and
- a modulating chamber adjacent the output end-facing side of said follower piston in fluid communication with said centrifugal force measuring means, the pressurized hydraulic fluid from said centrifugal force measuring means urging said follower piston toward said null position.

54. The system of claim 53 wherein said driver means, said control valve and said command actuator are mechanically linked together by a feedback link to form a proportional controller.

55. The system of claim 41 wherein said fuel function means defines the prime mover ideal operating line for low fuel consumption.

56. The system of claim 41 wherein said prime mover is an internal combustion engine.

57. The system of claim 56 wherein said fuel delivery means comprises a throttle.

58. The system of claim 41 wherein said prime mover is the engine of an engine-driven vehicle.

59. The system of claim 58 wherein said fuel delivery means comprises a throttle.

60. The system of claim 41 wherein the transmission provides substantially all ratios to maintain constant output shaft speed for any normally encountered load while said fuel delivery means is controlled only in accordance with said fuel function.

61. A control system for use in a motor vehicle having an engine, fuel delivery means for delivering a variable quantity of fuel to said engine, command means for commanding desired power or torque, an output shaft for delivering motive power and torque from said engine, and a continuously variable ratio V-belt traction drive transmission interconnecting said engine and said output shaft, said transmission comprising an adjustable drive diameter driver sheave coupled to said engine having a fixed driver flange and an axially movable driver flange, said driver flanges defining a variable width, tapered, belt-receiving driver groove therebetween, an adjustable drive diameter driven sheave coupled to said output shaft having a fixed driven flange and an axially movable driven flange, said driven flanges defining a variable width, tapered, belt-receiving driven groove therebetween, and a substantially inextensible V-belt in said driver and driven grooves interconnecting said sheaves, the control system comprising:
- an hydraulic driver actuation chamber including a piston movable within said actuation chamber and coupled to said movable driver flange for axially moving and positioning said movable driver flange;
- an hydraulic control valve in fluid communication with said actuation chamber for directing hydraulic fluid to or from said actuation chamber;
- a command actuator interconnecting said command means and said control valve, said actuation chamber, said control valve and said command actuator being mechanically linked together by a feedback link to form a proportional controller;
- a torque ramp on said output shaft coupled to said movable driven flange for axially moving and positioning said movable driven flange as a function of the torque transmitted by said belt;
- fuel function means defining a desired fuel requirement for said prime mover in relation to prime mover operating speed;
- speed measuring means for measuring the speed of said prime mover; and
- fuel control means operatively coupled to said fuel function means and said fuel delivery means for controlling said fuel delivery means only in accordance with the fuel requirements defined by said fuel function means, so that the quantity of fuel delivered to said engine is determined only by the speed thereof.

62. The system of claim 61 furhter comprising sensitivity adjusting and overspeed prevention means operatively coupled to said command actuator and said output shaft for decreasing the sensitivity of said command means during relatively fast vehicle operation, and moving said movable driver flange toward said fixed driver flange to decrease the transmission ratio and increase the load on the engine as the speed of the engine approaches a predetermined maximum operating speed.

63. The system of claim 62 wherein said sensitivity adjusting and overspeed prevention means compares output shaft speed to a predetermined fast operation threshold value and diminishes the output torque commanded by said command means by a value which is a function of output shaft speed when the output shaft speed exceeds said fast operation threshold value, so that said power delivery system responds to commanded power during relatively fast vehicle operation, and responds to commanded torque during slower vehicle operation.

64. The system of claim 63 wherein said sensitivity adjusting and overspeed prevention means includes centrifugal force measuring means associated with said output shaft, the value by which said commanded output torque is diminished being proportional to the square of output shaft speed.

65. The system of claim 64 wherein said centrifugal force measuring means measures centrifugal force as an hydraulic pressure, said command actuator comprising:
a hollow body having an input end, and output end, and an axial bore therethrough;
a command piston slidable in said bore adjacent said input end of said body and operatively coupled to said command means;
a follower piston slidable in said bore adjacent said output end of said body and operatively coupled to said control valve;
a compliance compression spring in said bore between and divergently biasing said command piston and said follower piston;
a return spring in said bore in engagement with and urging said follower piston toward said input end of said body to a null position; and
a modulating chamber adjacent the output end-facing side of said follower piston in fluid communication with said centrifugal force measuring means, the pressurized hydraulic fluid from said centrifugal force measuring means urging said follower piston toward said null position.

66. The system of claim 61 further comprising underspeed prevention means operatively coupled to said speed measuring means and to said control valve for moving said movable driver flange away from said fixed driven flange to increase the ratio of said transmission and decrease the load on said engine if the measured speed of the engine falls below a predetermined minimum permissible operating speed.

67. The system of claim 66 wherein the rate at which said underspeed prevention means increases the transmission ratio is proportional to the drop in engine speed below said predetermined minimum permissible operating speed.

68. The system of claim 67 wherein said underspeed prevention means measures the drop in engine speed as an hydraulic pressure and applies said pressure to said control valve to adjust the position of said movable driver flange.

69. The system of claim 68 wherein said underspeed prevention means comprises an electrical pulse generator operatively coupled to said speed measuring means, the duty cycle of said pulse generator being proportional to the drop in engine speed below said predetermined minimum permissible operating speed, and a transducer operatively coupled to said pulse generator and said control valve for converting electrical pulses to pulses of hydraulic fluid pressure.

70. The system of claim 69 wherein said transducer comprises a solenoid-actuated hydraulic modulator valve.

71. The system of claim 61 wherein said fuel function means defines the engine ideal operating line for low fuel consumption.

72. The system of claim 61 wherein said fuel delivery means comprises a throttle.

73. The system of claim 61 wherein the transmission provides substantially all ratios to maintain constant output shaft speed for any normally encountered load while said fuel delivery means is controlled only in accordance with said fuel function.

* * * * *